United States Patent [19]
Kelly

[11] 3,745,381
[45] July 10, 1973

[54] ANGULAR DECEPTION JAMMER PROVIDING ADJUSTABLE WIDTH PULSES AFTER ADJUSTABLE TIME

[75] Inventor: William N. Kelly, Baltimore, Md.

[73] Assignee: The United States of America as represented by the Secretary of the Army, Washington, D.C.

[22] Filed: Jan. 7, 1972

[21] Appl. No.: 216,034

[52] U.S. Cl................. 307/265, 307/273, 307/296, 328/58
[51] Int. Cl. ............................................ H03k 1/18
[58] Field of Search................... 307/265, 273, 296; 328/58

[56] References Cited
UNITED STATES PATENTS

| | | |
|---|---|---|
| 3,085,165 | 4/1963 | Schaffert et al. .................... 307/273 |
| 2,402,917 | 6/1946 | Miller ............................... 328/58 X |
| 3,223,856 | 12/1965 | Joy.................................... 307/273 X |
| 3,244,909 | 4/1966 | Henderson...................... 307/273 X |

Primary Examiner—John Zazworsky
Attorney—Harry M. Saragovitz, Edward J. Kelly et al.

[57] ABSTRACT

A radar electronic counter-measure device comprising first and second cascaded monostable multivibrators. The first multivibrator is triggered to its unstable state by a pulse from the radar. When the output of the first multivibrator returns to its stable state, it initiates operation of the second multivibrator. The output of the second multivibrator is a pulse whose width is determined by adjustment of the period of the second multivibrator, and whose start-time is determined by adjustment of the period of the first multivibrator.

1 Claim, 2 Drawing Figures

ANGULAR DECEPTION JAMMER PROVIDING ADJUSTABLE WIDTH PULSES AFTER ADJUSTABLE TIME

BACKGROUND OF THE INVENTION

There are various known manners by which pulses for radar jamming may be generated. Heretofore, in order to have pulses of the proper delay time and pulse width, delay lines have been included in the pulse generators. The instant invention avoids the use of delay lines with their attendant expense and lack of each adjustment by using cascaded monostable multivibrators.

SUMMARY OF THE INVENTION

This invention includes two cascaded multivibrators each having an adjustable unstable period. One of the multivibrators is triggered into operation by a pulse from a radar system. The other multivibrator is triggered into operation when the one multivibrator returns to its stable state. The output of the other multivibrator is applied to the radar system as a jamming pulse.

DESCRIPTION OF THE PREFERRED EMBODIMENT

Figure 1:
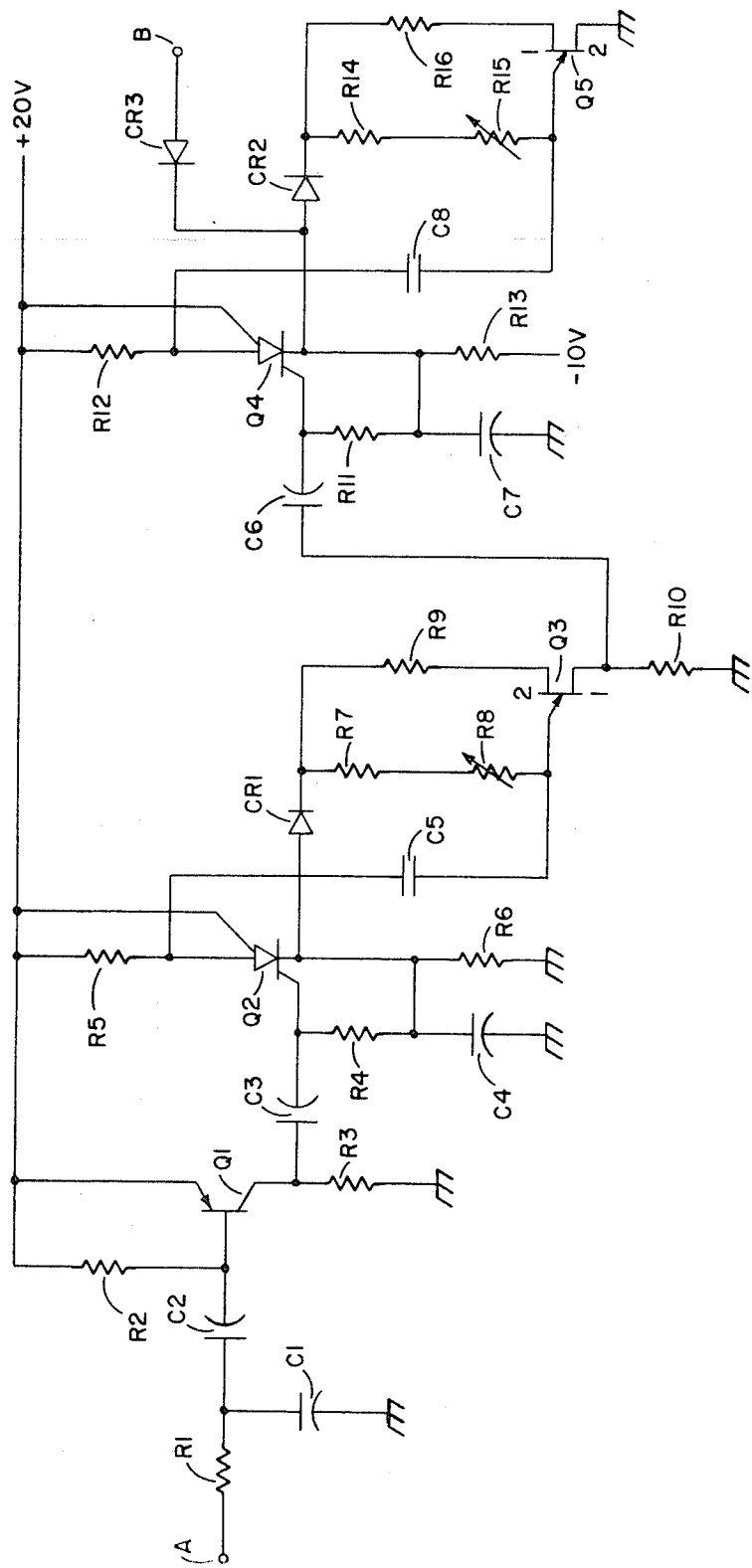
FIG. 1 of the drawings shows a detailed schematic diagram of the invention.

Referring to FIG. 1, a negative-going trigger pulse from the radar system (not shown) is applied to input terminal A. The network of R1 and C1 filters out noise spikes. Capacitor C2 couples the trigger pulse to the base of Q1. Since one end of R2 is connected to the +20 volt line, the base of Q1 is biased to approximately +20 volts. When the negative-going trigger pulse is applied, the base-emitter junction of Q1 is forward biased, and causes Q1 to turn on and produce a positive-going pulse at its collector. This positive-going pulse turns on semiconductor controlled switch Q2 through coupling capacitor C3. Resistor R4 and capacitor C4 insure proper turn-on of Q2 by limiting the initial voltage rise conditions on Q2. Resistors R5 and R6 are load resistors connected in series with Q2, with R6 larger than R5 so that approximately +18 volts appears at the cathode when Q2 conducts. Capacitor C5 begins to discharge through diode CR1 at a rate determined by R7 and R8. As C5 discharges, the voltage at the emitter of unijunction transistor Q3 rises. When the emitter-base 1 junction of Q3 conducts, C5 begins a more rapid discharge. When Q3 discharges C5, Q2 stops conducting. C5 then begins to recharge through Q3 and R10. A positive pulse is simultaneously generated at base 1 of Q3, and is coupled to the cathode gate of Q4, causing Q4 to conduct. Resistor R9 is used to temperature compensate Q3 to insure that Q3's firing voltage will remain constant with temperature changes. R10 is the load resistor for Q3 and accounts for the positive pulse at base 1. The voltage at the cathode of Q4 is approximately −5 volts when Q4 is not conducting. When the pulse from Q3 is applied to the cathode gate of Q4, Q4 conducts, and its cathode rises from −5 volts to +18 volts and CR3 is reverse biased. The anode of CR3 is connected to output terminal B. Current normally flows from terminal B through R13 to −10 volts until Q4 conducts. Transistor Q5 corresponds to Q3; resistors R11, R14, R15 and R16 respectively correspond in function to resistors R4, R7, R8 and R9; diode CR2 corresponds to CR1; and capacitors C7 and C8 respectively correspond to capacitors C4 and C5.

The adjustment of R8 determines the time at which Q3 conducts or the time delay between the application of negatively-going pulse at A and the turn-on of Q4. The adjustment of R15 determines the on-time of Q4, or the pulse width at output terminal B.

Figure 2:
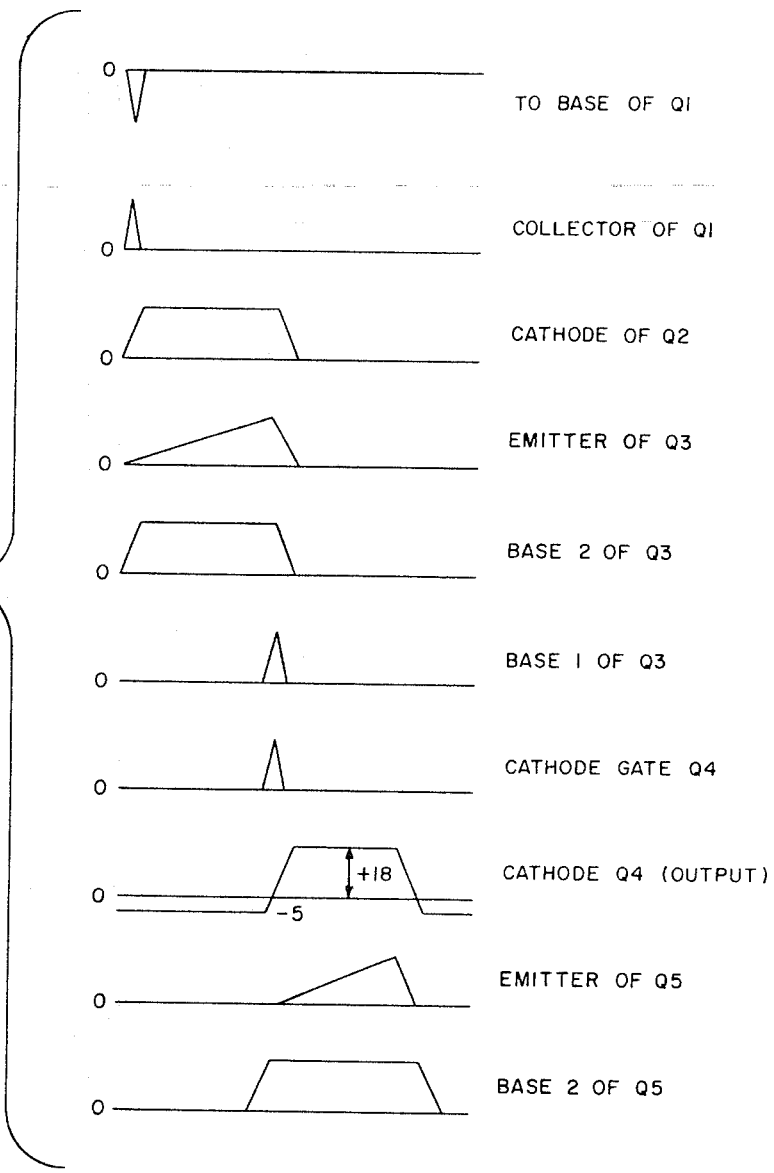
FIG. 2 shows the shapes of typical waveforms in FIG. 1.

The waveforms as shown in FIG. 2 are typical of the points indicated.

Typical examples of the values of the components of the invention are as follows:

| Component(s) | Value | Units |
|---|---|---|
| R1, R7 | 47,000 | ohms |
| R2, R6 | 2,200 | ohms |
| R3, R4, R11 | 1,000 | ohms |
| R5, R12 | 220 | ohms |
| R8 | 0–500,000 | ohms |
| R9, R16 | 680 | ohms |
| R10 | 100 | ohms |
| R13 | 3,900 | ohms |
| R14 | 20,000 | ohms |
| R15 | 100,000 | ohms |
| C1 | 0.001 | microfarads |
| C2 | 0.1 | microfarads |
| C3, C4, C6, C7 | 0.01 | microfarads |
| C5 | 4.7 | microfarads |
| C8 | 0.22 | microfarads |

| Component | Type |
|---|---|
| Q1 | 2N1309 |
| Q2, Q4 | 3N58 |
| Q3, Q5 | 2N2647 |
| CR1, CR2, CR3 | 1N645 |

I claim:

1. A device for providing, in response to an input pulse, an output pulse of an adjustable length after an adjustable time, including: a first monostable circuit having a trigger input and an output, and a second monostable circuit having a trigger input and an output, with the output of said first circuit connected to the trigger input of said second circuit, whereby said input pulse is applied to said trigger terminal of said first circuit and said output pulse appears at said output of said second circuit, wherein said circuits each include a semiconductor controlled switch having an anode and cathode, a positive voltage supply line; a negative voltage supply line; a circuit ground; wherein said circuits each respectively include a unijunction transistor each having first and second bases; first respective resistors connected between said positive supply line and the anodes of said switches; a pair of second resistors, one connected between the cathode of said first circuit switch and ground, and the other connected between the cathode of said second circuit switch and said negative supply line; respective capacitors connected between said anodes of said switches and respective emitters of said transistors; respective diodes and third resistors connected respectively in series between the cathodes of said switches and respective first bases of said transistors; a fourth resistor connected between the second base of said first circuit transistor and circuit ground; and fifth respective resistors connected between respective connections of said diodes and said third resistors and the respective emitters of said transistors, the anodes of said diodes being connected to respective cathodes of said switches.

* * * * *